United States Patent
Montoya et al.

(10) Patent No.: US 12,467,962 B2
(45) Date of Patent: Nov. 11, 2025

(54) PASSIVE ELECTROMAGNETIC AND THERMAL NOISE MITIGATION METHOD FOR CRYOGENIC RF DEVICES

(71) Applicant: The United States of America, as represented by the Secretary of the Navy, Arlingtion, VA (US)

(72) Inventors: Sergio A. Montoya, Chula Vista, CA (US); Jenna Jones, Campo, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 176 days.

(21) Appl. No.: 18/584,658

(22) Filed: Feb. 22, 2024

(65) Prior Publication Data
US 2025/0271478 A1    Aug. 28, 2025

(51) Int. Cl.
*G01R 29/08* (2006.01)
*H01Q 1/22* (2006.01)
*H01Q 1/42* (2006.01)
*H05K 9/00* (2006.01)

(52) U.S. Cl.
CPC ....... *G01R 29/0871* (2013.01); *H01Q 1/2283* (2013.01); *H01Q 1/42* (2013.01); *H05K 9/006* (2013.01)

(58) Field of Classification Search
CPC .... G01R 29/0871; H01Q 1/2283; H01Q 1/42; H05K 9/006
See application file for complete search history.

(56) References Cited

U.S. PATENT DOCUMENTS

| | | | |
|---|---|---|---|
| 8,516,834 B2 * | 8/2013 | Snow | F25B 9/14 62/51.1 |
| 8,910,824 B2 * | 12/2014 | Gore | G01R 33/3815 220/560.06 |
| 12,345,247 B2 * | 7/2025 | Amini | F04B 37/14 |
| 2010/0050661 A1 * | 3/2010 | Snow | F25B 9/14 62/51.1 |
| 2022/0057046 A1 * | 2/2022 | Dessau | F25B 9/10 |

(Continued)

*Primary Examiner* — David P Porta
*Assistant Examiner* — Gisselle M Gutierrez
(74) *Attorney, Agent, or Firm* — Naval Information Warfare Center Pacific; Kyle Eppele; J. Eric Anderson

(57) ABSTRACT

A cryogenic RF device comprising: a cryogenic enclosure, a cryocooler cold-finger, a sensor, an electromagnetic shield, and a thermal shield. The cryogenic enclosure is capable of maintaining an internal high-vacuum cryogenic environment and includes a radome and a vacuum chamber. The radome is, and the vacuum chamber is not, substantially transparent to desired RF signals. The sensor is disposed on the tip of the cold-finger in the radome. The electromagnetic shield is disposed within the vacuum chamber so as to shield electronic circuitry, but not the sensor, from external electromagnetic radiation. The thermal shield is disposed within the vacuum chamber so as to electrically isolate the electromagnetic shield from vacuum chamber walls. The electromagnetic shield and the thermal shield are electrically- and thermally-isolated from the cold-finger. The electromagnetic shield is electrically connected to at least one grounded electrical conductor that passes through an electrically-isolated feedthrough on the vacuum chamber.

20 Claims, 5 Drawing Sheets

(56) References Cited

U.S. PATENT DOCUMENTS

| | | | |
|---|---|---|---|
| 2024/0160973 A1* | 5/2024 | Amini | F25D 19/006 |
| 2024/0192099 A1* | 6/2024 | Doherty | G01N 25/145 |
| 2024/0292568 A1* | 8/2024 | Andrade | H05K 7/20372 |

* cited by examiner

50

```
┌─────────────────────────────────────────────────────┐
│ Dispose a sensor on a tip of a cryocooler cold-finger. │─ 50a
└─────────────────────────────────────────────────────┘
                          ↓
┌──────────────────────────────────────────────────────────────┐
│ Dispose the cryocooler cold-finger within a cryogenic enclosure │
│ having a radome and a vacuum chamber capable of maintaining an  │
│ internal high-vacuum cryogenic environment such that the cold-finger │─ 50b
│ extends through the vacuum chamber and the tip of the cold-finger is │
│ disposed within the radome.                                      │
└──────────────────────────────────────────────────────────────┘
                          ↓
┌──────────────────────────────────────────────────────────────┐
│ Shield contents of the vacuum chamber from external electromagnetic │
│ radiation with an electromagnetic shield disposed within the vacuum chamber. │─ 50c
└──────────────────────────────────────────────────────────────┘
                          ↓
┌──────────────────────────────────────────────────────────────┐
│ Electrically isolate the electromagnetic shield from internal vacuum │
│ chamber walls with an insulating thermal shield disposed between │
│ the internal vacuum chamber walls and the electromagnetic shield │─ 50d
│ such that there is no direct heat pathway between the cold-finger │
│ and the thermal shield or the electromagnetic shield.            │
└──────────────────────────────────────────────────────────────┘
                          ↓
┌──────────────────────────────────────────────────────────────┐
│ Electrically connect the electromagnetic shield to at least one │
│ grounded electrical conductor that passes through an            │─ 50e
│ electrically-isolated feedthrough on the vacuum chamber.        │
└──────────────────────────────────────────────────────────────┘
```

*Fig. 5*

PASSIVE ELECTROMAGNETIC AND THERMAL NOISE MITIGATION METHOD FOR CRYOGENIC RF DEVICES

FEDERALLY-SPONSORED RESEARCH AND DEVELOPMENT

The United States Government has ownership rights in the invention claimed herein. Licensing and technical inquiries may be directed to the Office of Research and Technical Applications, Naval Information Warfare Center Pacific, Code 72110, San Diego, CA, 92152; voice (619) 553-5118; NIWC_Pacific_T2@us.navy.mil. Reference Navy Case Number 113011.

BACKGROUND OF THE INVENTION

Superconductor-based quantum sensor technologies present a pathway to develop a new generation of devices with low size/weight/power and high sensitivity that are capable of detecting electromagnetic signals across the electromagnetic spectrum. These devices exploit quantum phenomena that arise in superconductor materials when cooled below their critical temperature (i.e., temperature below which these materials exhibit a superconducting state). By decreasing the temperature of the device to near absolute zero, temperature fluctuations are minimized allowing the exploitation of microscopic quantum phenomena. Some superconductor sensors need to be fully/partially exposed to electromagnetic spectrum such as radio frequency (RF) and/or optical signals. However, the performance of such sensors can be degraded when used outside of tightly controlled conditions. There is a need for an improved cryogenic RF device.

SUMMARY

Disclosed herein is a cryogenic RF device, an embodiment of which comprises a cryogenic enclosure, a cryocooler, a sensor, electronic circuitry, an electromagnetic shield, and a thermal shield. The cryogenic enclosure is capable of maintaining an internal high-vacuum cryogenic environment and includes a radome and a vacuum chamber. The radome is, and the vacuum chamber is not, substantially transparent to desired RF signals. The cryocooler cold-finger is disposed within the cryogenic enclosure such that the cold-finger extends through the vacuum chamber and a tip of the cold-finger is disposed within the radome. The sensor is disposed on the tip of the cold-finger. The electronic circuitry is disposed within the vacuum chamber and communicatively connected to the sensor. The electromagnetic shield is disposed within the vacuum chamber so as to shield the electronic circuitry, but not the sensor, from external electromagnetic radiation. The thermal shield is disposed within the vacuum chamber so as to electrically isolate the electromagnetic shield from vacuum chamber walls. The electromagnetic shield and the thermal shield are electrically- and thermally-isolated from the cold-finger. The electromagnetic shield is electrically connected to at least one grounded electrical conductor that passes through an electrically-isolated feedthrough on the vacuum chamber. Another embodiment of the cryogenic RF device is also disclosed herein where the sensor is embedded in a device package that comprises sensor-associated circuitry. The device package is disposed on a tip of the cold-finger such that the device package is disposed within the radome outside the vacuum chamber.

Also disclosed herein is a method for passive electromagnetic and thermal noise mitigation for the cryogenic RF device comprising the following steps. One step provides for disposing a sensor on a tip of a cryocooler cold-finger. Another step provides for disposing the cryocooler cold-finger within a cryogenic enclosure having a radome and a vacuum chamber capable of maintaining an internal high-vacuum cryogenic environment such that the cold-finger extends through the vacuum chamber and the tip of the cold-finger is disposed within the radome. Another step provides for shielding contents of the vacuum chamber from external electromagnetic radiation with an electromagnetic shield disposed within the vacuum chamber. Another step provides for electrically isolating the electromagnetic shield from internal vacuum chamber walls with an insulating thermal shield disposed between the internal vacuum chamber walls and the electromagnetic shield. The electromagnetic shield and the thermal shield are disposed within the vacuum chamber such that there is no direct heat pathway between the cold-finger and the thermal shield or the electromagnetic shield. The electromagnetic shield is electrically connected to at least one grounded electrical conductor that passes through an electrically-isolated feedthrough on the vacuum chamber.

BRIEF DESCRIPTION OF THE DRAWINGS

Throughout the several views, like elements are referenced using like references. The elements in the figures are not drawn to scale and some dimensions are exaggerated for clarity.

FIG. 5 is a flowchart.

DETAILED DESCRIPTION OF EMBODIMENTS

The disclosed methods and devices below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
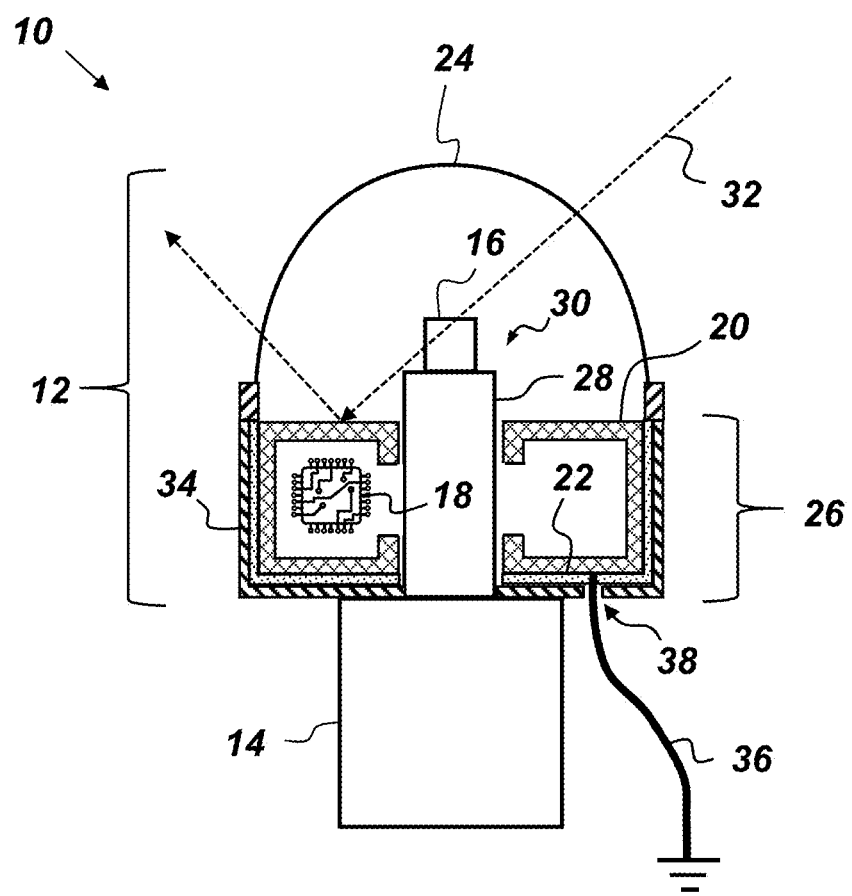
FIG. 1 is a cross-sectional, side-view illustration of an embodiment of an RF device.

FIG. 1 is a cross-sectional, side-view illustration of an embodiment of an RF device 10 that comprises, consists of, or consists essentially of a cryogenic enclosure 12, a cryocooler 14, a sensor 16, electronic circuitry 18, an electromagnetic shield 20, and a thermal shield 22. The cryogenic enclosure is capable of maintaining an internal high-vacuum cryogenic environment and includes a radome 24 and a vacuum chamber 26. The radome 24 is, and the vacuum chamber 26 is not, substantially transparent to desired RF signals. The cryocooler 14 has a cold-finger 28 that is disposed within the cryogenic enclosure 12 such that the cold-finger 28 extends through the vacuum chamber 26 and such that a tip 30 of the cold-finger 28 is disposed within the radome 24. The sensor 16 is disposed on the tip 30 of the cold-finger 28. The electronic circuitry 18 is disposed within the vacuum chamber 26 and communicatively connected to the sensor 16. The electromagnetic shield 20 is disposed within the vacuum chamber 26 so as to shield the electronic circuitry 18, but not the sensor 16, from external electromagnetic radiation 32, which may include a desired RF signal. The thermal shield 22 is disposed within the vacuum chamber 26 so as to electrically isolate the electromagnetic shield 20 from vacuum chamber walls 34. The electromagnetic shield 20 and the thermal shield 22 are electrically- and thermally-isolated from the cold-finger 28. The electromagnetic shield 20 is electrically connected to at least one grounded electrical conductor 36 that passes through an electrically-isolated feedthrough 38 in the vacuum chamber 26.

The RF device 10 exhibits improved performance over previous versions of cryogenic RF devices and circuits by providing a pathway to shield components that are housed within the cryogenic enclosure 12 from electromagnetic radiation, thus attenuating or eliminating electromagnetic coupling effects and thermal effects that can incorporate unnecessary electromagnetic and thermal noise. Embodiments of the RF device 10 may be used to apply a collection of passive shielding techniques that enables creating a temperature-robust and electromagnetic quiescent environment for high sensitivity RF devices. The cryogenic enclosure 12 may be configured to maintain an internal high or ultra-high vacuum environment as desired or required to cool-down the electronic circuitry 18, which may be, for example, superconductor-based electronic circuits and systems. The cold-finger 28 may be, for example, a physical probe that generates a localized cold surface. The electromagnetic and thermal shields 20 and 22 of the RF device 10 attenuate or eliminate the electromagnetic and thermal noise that is generated from RF signals that scatter within the cryogenic enclosure 12.

Figure 2A:
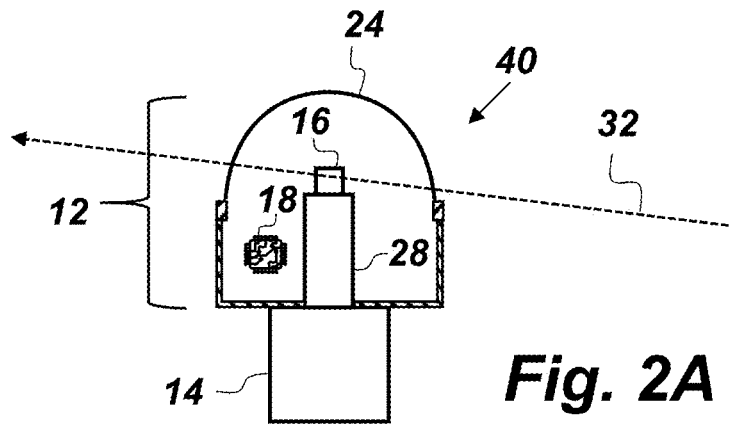
FIGS. 2A, 2B, and 2C are side-view illustrations of a cryogenic RF device without an electromagnetic or thermal shield.
Figure 2B:
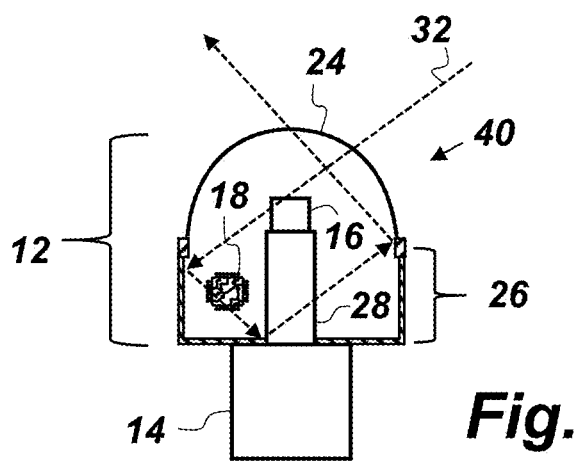
Figure 2C:
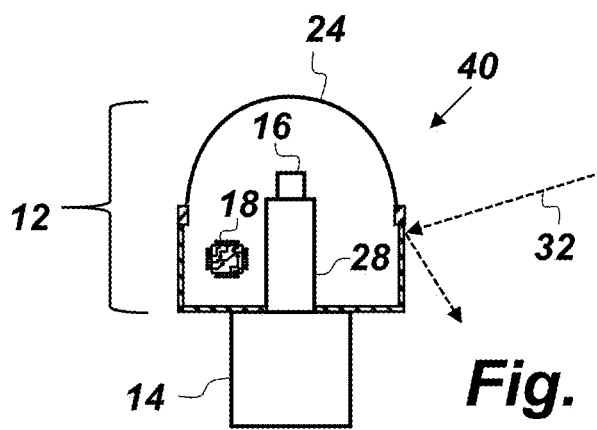

FIGS. 2A, 2B, and 2C are side-view illustrations of three potential cases that may occur when incident electromagnetic radiation 32 converges with a cryogenic RF device 40 that lacks an electromagnetic or thermal shield. In general, the scattering and absorption of incident electromagnetic waves introduces unnecessary noise or heat that can impact the performance of high sensitivity room-temperature and cryogenic RF devices. FIG. 2A illustrates the case where incident electromagnetic radiation 32 travels through the radome 24 and interacts with the sensor 16 without scattering within the cryogenic enclosure 12. FIG. 2B illustrates the case where incident electromagnetic radiation 32 travels through the radome 24, interacts with the sensor 16 and scatters within the cryogenic enclosure 12. FIG. 2C illustrates the case where the incident electromagnetic radiation 32 reflects off the cryogenic RF device 40 without passing into the cryogenic enclosure 12.

RF signals that scatter within the cryogenic enclosure 12 (e.g. reflecting off of internal metallic components) generate time-varying eddy currents which result in additional electromagnetic fields (i.e., indirect electromagnetic interference). Moreover, an RF signal scattered within the cryogenic enclosure 12 can couple with internal electronic circuitry introducing direct electromagnetic interference. In the case where the incident electromagnetic radiation 32 reflects off the cryogenic RF device 40 without passing into the cryogenic enclosure 12 (such as illustrated in FIG. 2C), such reflected radiation can also lead to the generation of eddy currents that yield additional indirect electromagnetic interference. If the incident electromagnetic radiation 32 consists of high-frequency RF signals which scatter multiple times within the vacuum chamber 26 (such as shown in FIG. 2B), indirect and direct electromagnetic noise is generated which raises the overall system noise level of the cryogenic RF device 40. If the incident electromagnetic radiation 32 consists of visible-spectrum signals then scattering events may introduce heat that can degrade the performance of the cryocooler 14 and the electronic circuitry 18 inside the cryogenic enclosure 12.

Referring back to FIG. 1, the RF device 10 utilizes carefully-conceptualized passive techniques to mitigate electromagnetic and thermal noise that that can impact the system performance of cryogenic packages operating high sensitivity RF devices. FIG. 1. shows the electromagnetic shield 20 is electrically-isolated from the internal vacuum chamber walls via the thermal shield 22, which may be made of an insulating-material. There is no direct heat pathway between the cold-finger 28 and the electromagnetic shield 20 or between the cold-finger 28 and the thermal shield 22. This thermal isolation reduces the amount of limited cryocooler lift power (e.g. ability to cool down objects placed on the cryocooler cold-finger 28) that will be used to cool-down components/electronics that interface with the sensor 16. The electromagnetic shield 20 is electrically connected to the grounded electrical conductor 36 that differs from the ground source of the cryocooler 14, the sensor 16, and the electronic circuitry 18. This serves to displace out of the RF device 10 localized eddy currents generated by scattered RF signals.

Still referring to FIG. 1, when high-frequency and (weak, moderate)-power RF signals emanate across the radome 24 and towards the vacuum chamber 26, two effects can be expected to take place: a portion of the RF signal power will be absorbed by the electromagnetic shield 20 (and then displaced to a ground source via the grounded electrical conductor 36) while the other portion will be reflected (e.g. the electromagnetic shield 20 can act also act as ground plane). The utilization of the internal electromagnetic shield 20 mitigates scattering phenomena within the vacuum chamber 26. In the event of high-frequency and high-power RF signals traveling across/through the radome 24, internal scattering will likely occur within the cryogenic enclosure 12, but the expected impact will be lower compared to a case when no electromagnetic shield is utilized (such as shown in FIG. 2B with respect to RF device 40). In terms of RF signals scattering off the vacuum chamber walls 34 (such as depicted in FIG. 2C), the electromagnetic fields generated by the localized eddy currents on the vacuum chamber of RF device 10 will be attenuated into the internal electromagnetic shield 20—thus mitigating/attenuating this indirect source of electromagnetic noise as well.

Thermally, the electromagnetic and thermal shields 20 and 22 of RF device 10 serve as an additional heat-barrier to isolate the cryogenic environment from radiative heat sources that lower the performance of the cryocooler 14. When visible-spectrum electromagnetic radiation travels across the radome 24, the thermal radiation will be less able to scatter through the internal walls 34 of the vacuum chamber 26 and potentially sync with the cryocooler cold-finger 28. Instead, heat collected by the electromagnetic shield 20 will displace outside the cryogenic enclosure 12 to the ground source.

Figure 3A:
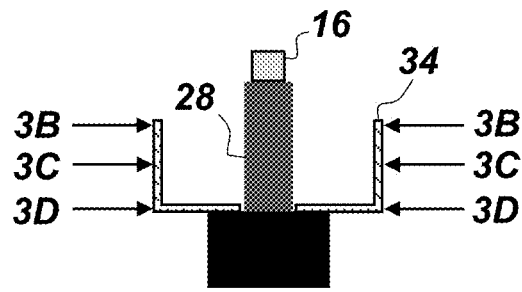
FIGS. 3A and 3E are side-view illustrations of an embodiment of an RF device.
Figure 3B:
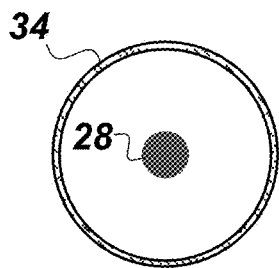
FIGS. 3B, 3C, and 3D are respectively cross-sectional views of a top, a center, and a bottom of a vacuum chamber.
Figure 3C:
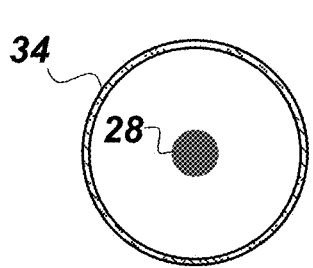
Figure 3D:
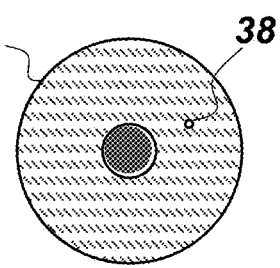

FIG. 3A is a side-view illustration of an embodiment of the RF device 40 that lacks an electromagnetic or thermal shield. FIGS. 3B, 3C, and 3D are cross-sectional, top views of the RF device 40. The radome 24 is not depicted in FIGS. 3A, 3B, 3C, and 3D to facilitate depiction of the internal components of the RF device 10. FIGS. 3B, 3C, and 3D are respectively cross-sectional views of a top, a center, and a bottom of the vacuum chamber 26. Inputs/outputs (electrical, vacuum, optical, etc.) from room-temperature to the cryogenic enclosure 12 are achieved via feedthrough(s) 38.

Figure 3E:
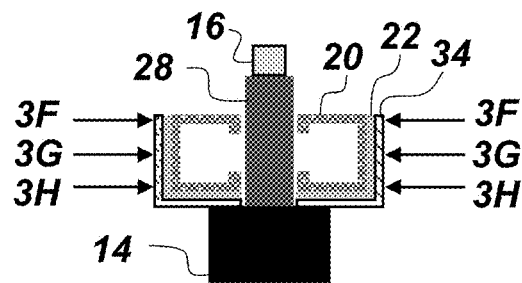
Figure 3F:
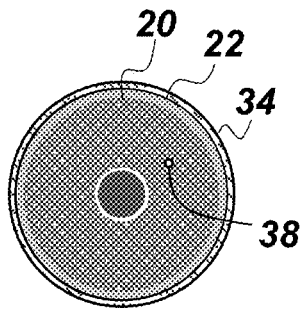
FIGS. 3F, 3G, and 3H are cross-sectional, top views of an RF device 10 respectively showing a top, a center, and a bottom of an electromagnetic shield.
Figure 3G:
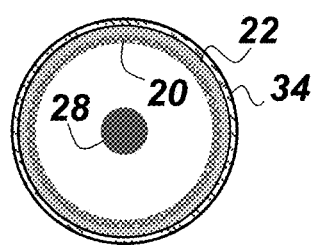
Figure 3H:
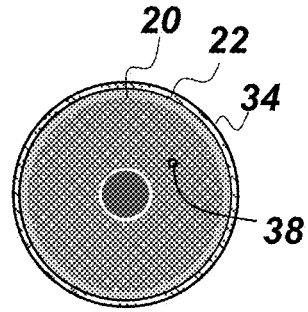

FIG. 3E is a side-view illustration of an embodiment of the RF device 10 showing the electromagnetic shield 20 and the thermal shield 22. The radome 24 is not depicted in FIGS. 3E, 3F, 3G, and 3H to facilitate depiction of the internal components of the RF device 10. FIGS. 3F, 3G, and 3H are cross-sectional, top views of the RF device 10 respectively showing a top, a center, and a bottom of the electromagnetic shield 20. Inputs/outputs (electrical, vacuum, optical, etc.) from room-temperature to the cryogenic enclosure 12 are achieved via feedthrough(s) 38.

FIGS. 4A, 4B, 4C, 4D, 4E, 4F, 4G, and 4H are cross-sectional, side views of different embodiments of the RF device 10. The electromagnetic shield 20, which may be a faraday shield, may be made of any electrically conductive material. The electromagnetic shield 20 may have a single- or multi-element composition. Suitable example structures for the electromagnetic shield 20 include, but are not limited to, crystalline, polycrystalline, and amorphous structures. For example, the electromagnetic shield 20 can consist of more than one conductive layer, where each conductive layer consists of either a single- or multi-element material. The thermal shield 22 may be made of any insulator and can have a single- or multi-element composition (crystalline, polycrystalline, and/or amorphous). For example, the thermal shield 22 can consist of more than one insulating layer, where each insulating layer consists of either a single- or multi-element material. The thermal shield 22 separates the electromagnetic shield 20 and the internal vacuum chamber wall 34 and does not need to completely encapsulate/cover the whole surface of the electromagnetic shield 20. Further, the thermal shield 22 does not necessarily need to be in direct physical contact with the internal vacuum chamber walls 34 nor with the electromagnetic shield 20. Suitable examples of the sensor 16 include, but are not limited to, a superconducting sensor, and a quantum sensor. In some embodiments, the electromagnetic shield 20 may have a high conductivity metal component and a high magnetic permeability metal component. In some embodiments of the RF device 10, the grounded electrical conductor 36 does not share a common ground with equipment that produces the internal high-vacuum cryogenic environment within the cryogenic enclosure 12, nor any passive/active electronics 18 within the cryogenic enclosure 12, nor the sensor 16.

Figure 4A:
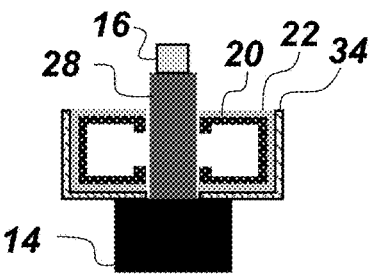
FIGS. 4A, 4B, 4C, 4D, 4E, 4F, 4G, 4H, and 4I are cross-sectional, side views of different embodiments of an RF device.
Figure 4B:
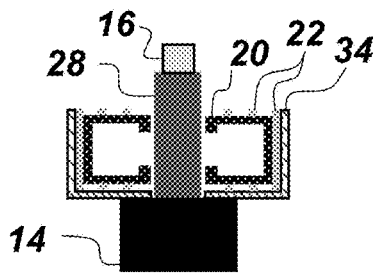
Figure 4C:
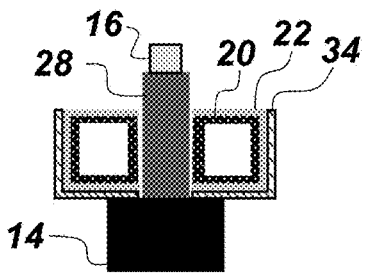
Figure 4D:
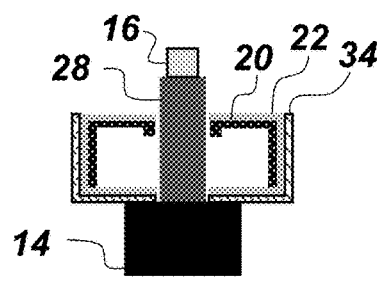
Figure 4E:
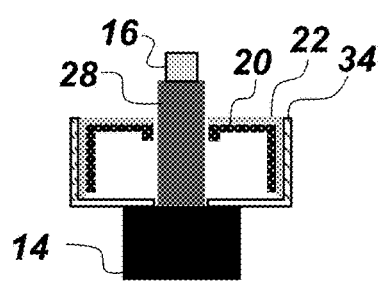
Figure 4F:
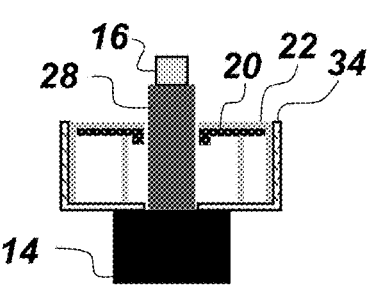
Figure 4G:
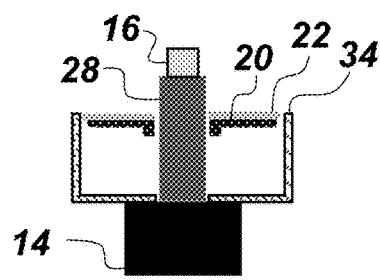
Figure 4H:
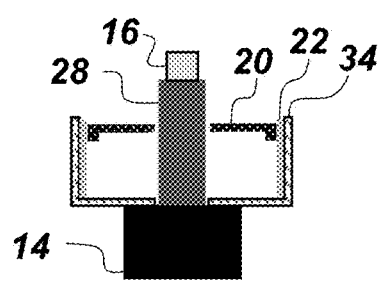
Figure 4I:
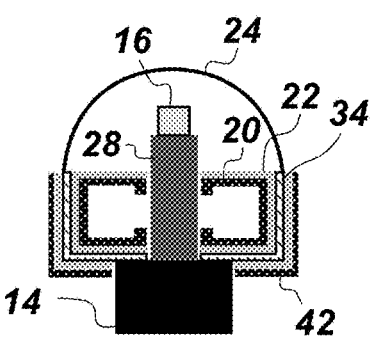

FIG. 4I shows a cross-section, side view of an embodiment of the RF device 10 that includes an external electromagnetic shield 42 disposed around an exterior of the vacuum chamber 26, but not the radome 24. The external electromagnetic shield 42 is electrically isolated from the vacuum chamber walls 34. The external electromagnetic shield 42 may be connected to the grounded electrical conductor 36 (such as shown in FIG. 1) such that the external electromagnetic shield 42 and the grounded electrical conductor 36 do not share a common ground with the cryocooler 14 or the electronic circuitry 18. The sensor 16 may be embedded in a device package that comprises sensor-associated circuitry. Also, the device package itself may be disposed on the tip 30 of the cold finger 28 outside of the vacuum chamber 26.

FIG. 5 is a flowchart of a method 50 for passive electromagnetic and thermal noise mitigation for a cryogenic RF device comprising the following steps. One step $50_a$ provides for disposing a sensor on a tip of a cryocooler cold-finger. Another step $50_b$ provides for disposing the cryocooler cold-finger within a cryogenic enclosure having a radome and a vacuum chamber capable of maintaining an internal high-vacuum cryogenic environment such that the cold-finger extends through the vacuum chamber and the tip of the cold-finger is disposed within the radome. Another step $50_c$ provides for shielding contents of the vacuum chamber from external electromagnetic radiation with an electromagnetic shield disposed within the vacuum chamber. Another step $50_d$ provides for electrically isolating the electromagnetic shield from internal vacuum chamber walls with an insulating thermal shield disposed between the internal vacuum chamber walls and the electromagnetic shield such that there is no direct heat pathway between the cold-finger and the thermal shield or the electromagnetic shield. Another step $50_e$ provides for electrically connecting the electromagnetic shield to at least one grounded electrical conductor that passes through an electrically-isolated feedthrough on the vacuum chamber.

From the above description of the RF device 10, it is manifest that various techniques may be used for implementing the concepts of RF device 10 and method 50 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that RF device 10 is not limited to the particular embodiments described herein, but is capable of many embodiments without departing from the scope of the claims.

We claim:

1. A cryogenic RF device comprising:
   a cryogenic enclosure capable of maintaining an internal high-vacuum cryogenic environment, wherein the cryogenic enclosure includes a radome and a vacuum chamber, and wherein the radome is, and the vacuum chamber is not, transparent to desired RF signals;
   a cryocooler cold-finger disposed within the cryogenic enclosure such that the cold-finger extends through the vacuum chamber and a tip of the cold-finger is disposed within the radome;
   a sensor disposed on the tip of the cold-finger;
   electronic circuitry disposed within the vacuum chamber and communicatively connected to the sensor;
   an electromagnetic shield disposed within the vacuum chamber so as to shield the electronic circuitry, but not the sensor, from external electromagnetic radiation; and
   a thermal shield disposed within the vacuum chamber so as to electrically isolate the electromagnetic shield from vacuum chamber walls, wherein the electromagnetic shield and the thermal shield are electrically- and thermally-isolated from the cold-finger, and wherein the electromagnetic shield is electrically connected to at least one grounded electrical conductor that passes through an electrically-isolated feedthrough on the vacuum chamber.

2. The cryogenic RF device of claim 1, wherein the sensor is a quantum sensor.

3. The cryogenic RF device of claim 1, wherein the electronic circuitry comprises passive and active electronics and input/output cables.

4. The cryogenic RF device of claim 1, wherein the electronic circuitry is superconducting electronic circuitry.

5. The cryogenic RF device of claim 1, wherein the electromagnetic shield has a high conductivity metal component and a high magnetic permeability metal component.

6. The cryogenic RF device of claim 1, wherein the grounded electrical conductor does not share a common ground with equipment that produces the internal high-vacuum cryogenic environment within the cryogenic enclosure, or any of the shielded components within the cryogenic enclosure, nor the sensor.

7. The cryogenic RF device of claim 1, further comprising an external electromagnetic shield disposed around an exterior of the vacuum chamber, but not the radome, such that the external electromagnetic shield is electrically isolated from the vacuum chamber walls.

8. The cryogenic RF device of claim 7, wherein the external electromagnetic shield and the grounded electrical conductor do not share a common ground with equipment that produces the internal high-vacuum cryogenic environment.

9. The cryogenic RF device of claim 1, wherein the electromagnetic shield is made of a single-element conductive material selected from a group consisting of crystalline materials, polycrystalline materials, and amorphous materials.

10. The cryogenic RF device of claim 1, wherein the electromagnetic shield is made of a multi-element conductive material selected from a group consisting of crystalline materials, polycrystalline materials, and amorphous materials.

11. The RF device of claim 1, wherein the sensor is embedded in a device package that comprises sensor-associated circuitry, and wherein the device package is disposed on the tip of the cold finger.

12. A cryogenic RF device comprising:
a cryogenic enclosure capable of maintaining an internal high-vacuum cryogenic environment, wherein the cryogenic enclosure includes a radome and a vacuum chamber, and wherein the radome is, and the vacuum chamber is not, transparent to desired RF signals;
a cryocooler cold-finger disposed within the vacuum chamber; a sensor embedded in a device package that comprises sensor-associated circuitry, wherein the device package is disposed on a tip of the cold-finger such that the device package is disposed within the radome outside the vacuum chamber;
electronic circuitry disposed within the vacuum chamber and communicatively connected to the sensor; an electromagnetic shield disposed within the vacuum chamber so as to shield contents of the vacuum chamber from external electromagnetic radiation; and
a thermal shield disposed within the vacuum chamber so as to electrically isolate the electromagnetic shield from internal vacuum chamber walls, wherein the electromagnetic shield and the thermal shield are electrically- and thermally-isolated from the cold-finger, and wherein the electromagnetic shield is electrically connected to at least one grounded electrical conductor that passes through an electrically-isolated feedthrough on the vacuum chamber.

13. A method for passive electromagnetic and thermal noise mitigation for a cryogenic RF device comprising:
disposing a sensor on a tip of a cryocooler cold-finger;
disposing the cryocooler cold-finger within a cryogenic enclosure having a radome and a vacuum chamber capable of maintaining an internal high-vacuum cryogenic environment such that the cold-finger extends through the vacuum chamber and the tip of the cold-finger is disposed within the radome, wherein the radome is, and the vacuum chamber is not, transparent to desired RF signals;
shielding contents of the vacuum chamber from external electromagnetic radiation with an electromagnetic shield disposed within the vacuum chamber; and
electrically isolating the electromagnetic shield from internal vacuum chamber walls with an insulating thermal shield disposed between the internal vacuum chamber walls and the electromagnetic shield, wherein the electromagnetic shield and the thermal shield are disposed within the vacuum chamber such that there is no direct heat pathway between the cold-finger and the thermal shield or the electromagnetic shield, and wherein the electromagnetic shield is electrically connected to at least one grounded electrical conductor that passes through an electrically-isolated feedthrough on the vacuum chamber.

14. The method of claim 13, further comprising exposing the radome to electromagnetic spectrum signals.

15. The method of claim 14, wherein the sensor is selected from a group consisting of quantum sensors and superconducting sensors.

16. The method of claim 13, wherein the electromagnetic shield has a high conductivity metal component and a high magnetic permeability metal component.

17. The method of claim 16, wherein the grounded electrical conductor does not share a common ground with equipment that produces the internal high-vacuum cryogenic environment of the cryogenic enclosure or with any shielded components inside the cryogenic enclosure.

18. The method of claim 17, further comprising disposing an external electromagnetic shield around an exterior of the vacuum chamber, but not the radome, such that the external electromagnetic shield is electrically isolated from an exterior wall surface of the vacuum chamber.

19. The method of claim 18, wherein the external electromagnetic shield and the grounded electrical conductor do not share a common ground with equipment that produces the internal high-vacuum cryogenic environment, or any of the shielded components within the cryogenic enclosure, nor the sensor.

20. The method of claim 13, wherein the thermal shield is not in direct physical contact with the vacuum chamber walls nor the electromagnetic shield.

* * * * *